PIEZOELECTRIC STEREO CARTRIDGE

Filed Dec. 8, 1958 2 Sheets-Sheet 1

Dec. 4, 1962 C. T. HEINLEIN 3,067,296

PIEZOELECTRIC STEREO CARTRIDGE

Filed Dec. 8, 1958 2 Sheets-Sheet 2

United States Patent Office 3,067,296

Patented Dec. 4, 1962

3,067,296

PIEZOELECTRIC STEREO CARTRIDGE

Carl Trevor Heinlein, Cheshunt, England, assignor to Cosmocord Limited, Waltham Cross, England Filed Dec. 3, 1958, Ser. No. 778,926
Claims priority, application Great Britain Dec. 11, 1957
1 Claim. (Cl. 179—100.41)

This invention relates to transducers employing piezoelectric materials, and has for its object to provide a transducer which has a piezoelectric response which is different for different modes of mechanical strain.

In particular there is provided in accordance with the invention a transducer which has a force coupling member attached thereto, and a plurality of electrical circuits, wherein motion of the coupling member in directions which are at a substantial angle to each other are accompanied by substantially different voltages in the output circuits. As will appear hereinafter, motion of the coupling member in one of the two directions can be accompanied by a voltage in one only of two circuits, the voltage in the other circuit being zero, and the reverse condition obtaining in the circuits when the coupling member is moved in the other of the two directions.

While a transducer in accordance with the invention has various applications where vectorial sensitivity of the transducer is required, a particular application is to gramophone pickups or cutters for use with gramophone records in which a single track, traced by a single stylus or cutter has two sound records recorded therein. The two records can be those of a two channel stereophonic system. In such an application, one record can be made on the hill and dale or vertical principle and the other on the lateral cut principle. Alternatively, and as is now being adopted as the standard for records of this type, the records can be made on the two walls of a groove, the walls being at an angle of 45° to the vertical and the oscillations of the two recordings being therefor in planes at right angles. For successful results with such a system it is important that cross modulation between the records should be small. By cross modulation is meant that a record made in one wall only should produce a useful output voltage in the one output circuit and a negligible output in the other.

The present invention consists of a piezoelectric element assembly comprising at least two piezoelectric elements having adjacent surfaces thereof restrained against relative movement, said elements having the crystal axes thereof differently orientated.

The invention also includes a piezoelectric element assembly comprising at least two similarly shaped piezoelectric elements having similar surfaces thereof held together to restrain them against relative movement, one of the crystal axes of one element lying at an angle to the corresponding axis of the other element.

The invention further includes a gramophone pickup comprising a piezoelectric transducer, for reproduction from a record groove modulated in different directions in the transverse plane in accordance with two intelligence signals, and comprising a stylus for engagement with said groove, a piezoelectric transducer assembly having two outputs in which appears voltages corresponding each to one only of said signals in response respectively to a torsional stress and to a bending stress and a mechanical coupling means for imposing a torsional stress on the assembly in response to movement of the stylus in one direction and a bending stress in the other.

The features and advantages of the invention will more clearly appear from the following description, in conjunction with the accompanying drawings, in which.

In the embodiments of the invention which are illustrated in these drawings, and which will be described in more detail hereinafter, there is used a transducer element which uses at least two plates of piezoelectric material which have their piezoelectric axes disposed at different angles, and it is convenient first to consider the operation of such a transducer.

Figure 1:
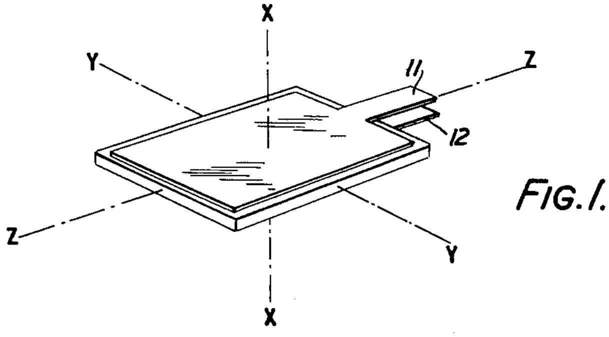
FIGURE 1 is a perspective view of a single piezoelectric crystal plate.

In FIGURE 1 there is indicated a plate 10 of piezoelectric material, of generally rectangular form; though the invention is not restricted to the use of any specific piezoelectric materials Rochelle salt is convenient, and has the advantage of high piezoelectric constants. The three conventional crystal axes are indicated at X, Y and Z. The plate is a 0° X-cut plate, or so-called shear plate, so that the plane of the plate is at right angles to the X-axis, and the major edges of the plate are parallel to the Z-axis.

Figure 2:
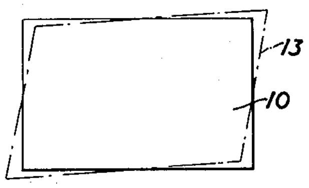
FIGURE 2 is a plan view of a crystal plate.

If suitable electrodes, such as 11, 12 are applied to the major surfaces of the plate 10, and an appropriate potential is applied to them, the plate will elongate on one diagonal of its major faces, and contract on the other. The result is that the crystal is subject to a shear stress, and will assume a shape as indicated by the dotted line 13 in FIGURE 2.

Figure 3:
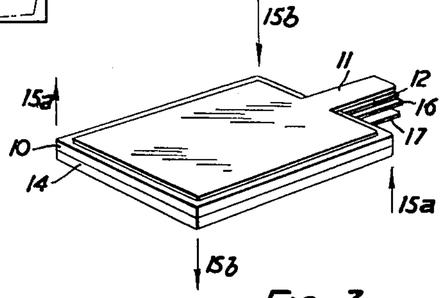
FIGURE 3 is a perspective view of a piezoelectric crystal plate assembly.

If a crystal plate such as 10 is secured to a plate 14 of material which has similar dimensions, and a similar modulus of elasticity, as shown in FIGURE 3, then the shear stress results in a torsional motion of the composite assembly, opposite corners moving in the same, and adjacent corners moving in opposite directions as indicated by the upward arrows **15*a* and downward arrows 15*b*. The plate 14 can itself be a crystal plate, similar to plate 10 but either reversed physically or oppositely polarised by the applied potential to electrodes 16, 17**, in which case the resulting torsional movement is enhanced. This assembly is the "twister bimorph" which is widely used.

Figure 4:
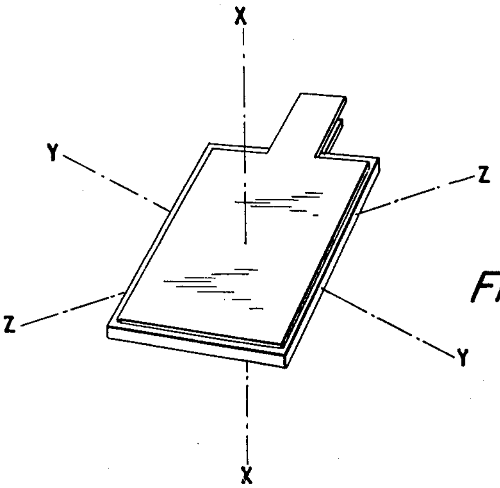
FIGURE 4 is a perspective view of a single piezoelectric crystal plate, similar to FIGURE 1, but cut at a different angle to the crystal axes.
Figure 5:
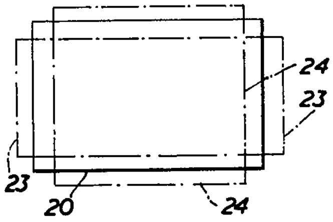
FIGURE 5 is a plan view of the plate of FIGURE 4.
Figure 6:
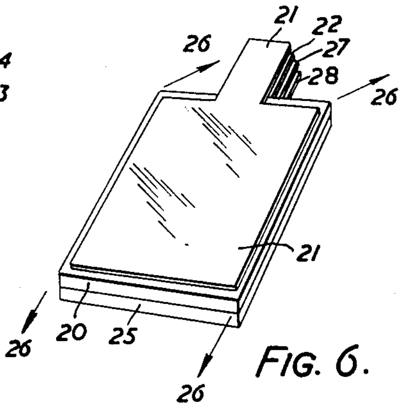
FIGURE 6 is a perspective view of a piezoelectric crystal plate assembly.

FIGURE 4 shows a plate 20 which is similar to plate 10, and like plate 10 has its major faces at right angles to the X-axis, but with plate 20 the major sides are at 45° to the Y- and Z-axes. If potential is applied to electrodes 21, 22 on the plate, it will be seen that one diameter of the plate will elongate and the other contract, in the manner indicated at 23 in FIGURE 5. If the plate were cut with its major diameter at right angles to the direction shown in FIGURE 4, or if the opposite polarity were used, then the effect would be reversed, as at 24. A plate such as 20 secured to a similar plate 25 FIGURE 6 and with a potential applied in the manner to produce a shape corresponding to 25 in FIGURE 5, will give rise to a bending motion of the assembly shown by the arrows 26 in FIGURE 6. As before, the plate 25 can be a piezoelectric plate with reversed characteristics, and provided with electrodes 27, 28 and the "bender bimorph" results.

In the foregoing, it has been assumed that a potential is applied to the electrodes, to produce a resultant mechanical movement of the elements. As is well known, the action is reversible, and a corresponding movement of the element will result in the generation of a potential on the electrodes of an element.

However, and this fact is important for the purpose of the present invention, if a pure torsional movement is applied to a bender bimorph, or a pure bending motion to a twister bimorph, no voltage output results. The reason for this will be apparent from a consideration of FIGURE 3. With an applied voltage of one polarity the motion of the four corners is as indicated by arrows 15*a* and 15*b*, if motion is imparted to the element 10 in the direction of the arrows 15*a* and 15*b*, then there will be generated on the electrodes 11, 12 a voltage of one polarity. If motion is imparted to the element in the reverse direction, downwards at 15*a* and upwards at 15*b*, the polarity will be reversed. If now all four corners are moved in the same direction, either upwards or downwards, with the centre part restrained in some way so that the plate is bent, the voltages which are produced will precisely cancel out, though there may be a current flow in electrodes 11, 12 themselves.

Similarly, if the bender bimorph 20, 24 is twisted, the generated voltages will cancel out.

Figure 7:
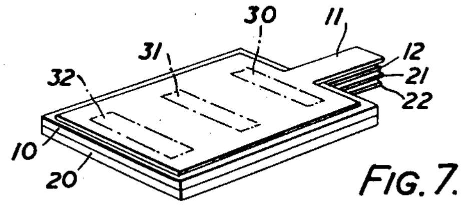
FIGURE 7 is a perspective view of another piezoelectric crystal plate assembly.

In the embodiments of the present invention to be described, a plate having the characteristics of the plate 10 or its inverse is combined with one having the characteristic of plate 20 or its inverse, as shown in FIGURE 7. The plate is provided with electrodes 11, 12 and 21, 22, but a common electrode 12, 21 can be used if desired, on the adjacent faces of the two plates.

The composite assembly has an appropriate restraint imposed upon it, so that it will respond to a simple force, and will not require a couple to drive it. The restraint can be imposed in a variety of ways; one way is by clamping pads applied along one edge as at 30 and at a diameter of the assembly, parallel to that edge, as at 31. The force can be applied to a point along the parallel edge, as at 32. From the foregoing it will be appreciated that a force at 32 tending to twist the assembly will produce an output on electrodes 11, 12, but not on 21, 22, whilst a bending force will produce an output on electrodes 21, 22 and not on 11, 12.

Figure 9:
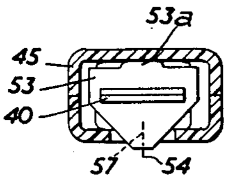
FIGURE 9 is a transverse sectional view on the line 9—9 of FIGURE 8.
Figure 8:
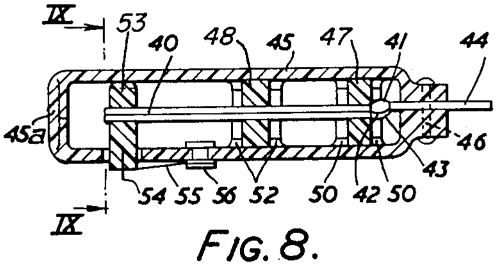
FIGURE 8 is a longitudinal section through a gramophone pickup in accordance with the invention.

A gramophone pickup cartridge using a composite element of this kind is shown in FIGURES 8 and 9. This cartridge is intended for use with vertical and lateral, or "hill and dale"; though this type of cartridge now finds less use than the 45—45° system referred to above, it will be first described as its operation is more easily understood.

This cartridge includes a composite transducer element 40, comprising a twister and a bender assembly as described above. The element is provided with electrodes connected by flexible leads 41, 42, 43 to output contacts 44. The element is provided with a moisture-proof coating, not shown, in known manner. The element is mounted in a casing 45 moulded from a synthetic resin; conveniently the casing is formed in one part with an integral hinge portion 45*a* about which the casing can be folded as shown. The folded casing can be secured by a rivet or the like at 46, and thereby the contacts 44 are clamped in position.

The element 40 is located in the casing by a rear pad 47 of a material such as a plasticised polyvinyl chloride, and an intermediate pad 48 of similar material. The shaping of the pads is important, since they will have a direct effect on the stylus tip compliance and impedance of the pickup in use, and in the voltage output, as will be readily apparent to those skilled in the art. The pad can itself be located in the casing by means of projections 50 formed integrally on the inner walls of the casing.

The second pad 48 engages the composite element at a point intermediate its ends; the primary need for this pad is to enable bending stress to be applied to the element. For this reason, it may present a less compliance to the bending than to torsional movement of the element. It may be located at about the midpoint of the element. Like pad 47, pad 48 can be located in the casing by integral projections at at 52.

The front end of the element is connected to a coupling member 53, by which motion is imparted to the element from a stylus 54, carried upon an arm 55. Arm 55 is mounted at its rear end in a grommet or plug 56 which may be of material silimar to pads 47 and 48. The stylus is effectively coupled to the coupling member 53, either by small flanges on the arm 55 engaging the sides of the tip of coupling member 53 or, as shown, by an extension on the end of the stylus at 57 which enters a hole in the coupling member. The coupling member can also be formed with a small projection 53*a* in the middle of its top edge, engaging the casing. This helps to isolate the bending and twisting movements imparted to the element, and to reduce excessive movement of the free end of the element.

The operation of the cartridge described will be readily apparent; vertical movements or vertical components of movements, of the stylus will produce an output on the bender crystal plate, while lateral movements or lateral components of movements of the stylus will be transmitted as a torsional movement to the element and will produce an output on the twister plate. The coupling member is made of a compliant material, similar or the same as that selected for pads 47 and 48, and chosen to give the desired degree of coupling and clamping between the stylus and the composite element. Its shape can also be varied so that it presents different compressional and torsional compliances.

Figure 10:
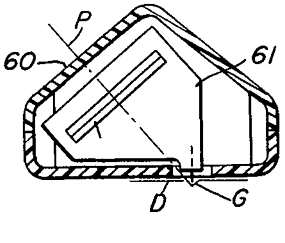
FIGURE 10 is a transverse sectional view of an alternative form of pickup.

By combination of the outputs of the two plates of the cartridge described, in appropriate phase, the cartridge can be used for the 45—45° system mentioned above, but in general it is preferred to have an alternative construction for this purpose, as shown in FIGURE 10. This second construction closely resembles the first, except that the assembly is rotated through 45°, about its longitudinal axis. It is then convenient to re-shape the casing 60, and especially the front, coupling member 61. While this resembles the coupling member 53, the member 61 is shaped so that the major surfaces of the plates of the piezoelectric crystal assembly 40 lie at an angle of 45° to the plane of a record disc D of the type having a V-shaped groove G with the two groove walls disposed at an angle of 45° to the plane of the disc and wherein the axis of the stylus 54 lies at an angle of 45° to the major surfaces of the plate assembly 40. The tip of the stylus 54 intersects a plane P containing the longitudinal center line of the plate assembly 40 and which is normal to the major surfaces of the plates. With such a construction, only a bending moment is applied to the plate assembly 40 by movement of the stylus 54 in one of the two 45° directions determined by a signal modulated recording in one wall of the groove G, and similarly only a twisting moment is applied to the plate assembly by movement of the stylus in the other 45° direction in response to a signal modulated recording in the other wall of the groove. The other differences between the two constructions of cartridge will be readily apparent.

The invention thus makes possible a very simple and compact construction of cartridge.

I claim:

A gramophone pickup for cooperation with a planar disc containing a V-shaped groove, the walls of said groove lying at an angle of 45° to the plane of said disc and there being a signal modulated recording in each wall, said pickup comprising an electromechanical transducer having one plate of electromechanically active material responsive in the face shear mode and another plate of electromechanically active material responsive in an extensional mode, said plates being superposed and mechanically coupled with a respective major surface of each of confronting relation and said major surfaces of said plates lying at an angle of 45° to the plane of said disc, and a stylus coupled to said plates and having a tip engageable with the walls of said groove, the axis of said stylus lying at an angle of 45° to said major surfaces of said plates, and said stylus tip intersecting a plane containing the longitudinal center line of said plates and normal to said major surfaces thereof whereby only a bending moment is applied to said plates by movement of said stylus in one of the two 45° directions in response to the signal modulated recording in one wall of said groove and only a twisting moment is applied to said plates by movement of said stylus in the other 45° direction in response to the signal modulated recording in the other wall of said groove.

References Cited in the file of this patent

UNITED STATES PATENTS

| | | |
|---|---|---|
| 2,137,188 | Whitman | Nov. 15, 1938 |
| 2,775,460 | Shivack | Dec. 25, 1956 |
| 2,863,076 | Koren et al. | Dec. 2, 1958 |